United States Patent
Villella et al.

(10) Patent No.: US 7,308,353 B2
(45) Date of Patent: Dec. 11, 2007

(54) CLOSED LOOP VEHICLE DYNAMIC CONTROL FOR USE WITH YAW RATE CONTROLLERS

(75) Inventors: Matthew G. Villella, Hermosa Beach, CA (US); Edmund F. Gaffney, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 352 days.

(21) Appl. No.: 11/172,404

(22) Filed: Jun. 30, 2005

(65) Prior Publication Data

US 2007/0005214 A1    Jan. 4, 2007

(51) Int. Cl.
    *G06F 19/00* (2006.01)
(52) U.S. Cl. .......................................... 701/70; 701/41
(58) Field of Classification Search ................ 701/1, 701/41, 69, 70, 88; 180/410, 443, 446
    See application file for complete search history.

(56) References Cited

U.S. PATENT DOCUMENTS

| | | | | |
|---|---|---|---|---|
| 4,773,012 A | * | 9/1988 | Ito et al. ...................... 701/42 |
| 5,576,959 A | * | 11/1996 | Hrovat et al. ................. 701/70 |
| 5,842,754 A | * | 12/1998 | Sano ........................... 303/147 |
| 6,659,570 B2 | * | 12/2003 | Nakamura .................... 303/146 |
| 6,697,726 B2 | * | 2/2004 | Takagi et al. ................. 701/70 |

OTHER PUBLICATIONS

Sawase et al, "Application of Active Yaw Control to Vehicle Dynamics by Utilizing Driving/Breaking Force," JSAE Review 20 (1999), pp. 289-295.

* cited by examiner

*Primary Examiner*—Gary Chin

(57) ABSTRACT

A method for closed loop vehicle dynamic control with a yaw rate controller, such as for example a TVD, utilizing a first understeer gradient for vehicle lateral accelerations at or below a vehicle lateral acceleration threshold and a second understeer gradient for vehicle lateral accelerations thereabove, wherein the vehicle lateral acceleration threshold defines a vehicle lateral acceleration transition point. A first desired vehicle yaw rate per the first understeer gradient is determined, and a second desired vehicle yaw rate per the second understeer gradient is determined, wherein the second desired vehicle yaw rate at the predetermined vehicle lateral acceleration transition point is calibrated to equal the first desired vehicle yaw rate at the predetermined vehicle lateral acceleration transition point so as to avoid any discontinuity therebetween.

18 Claims, 2 Drawing Sheets

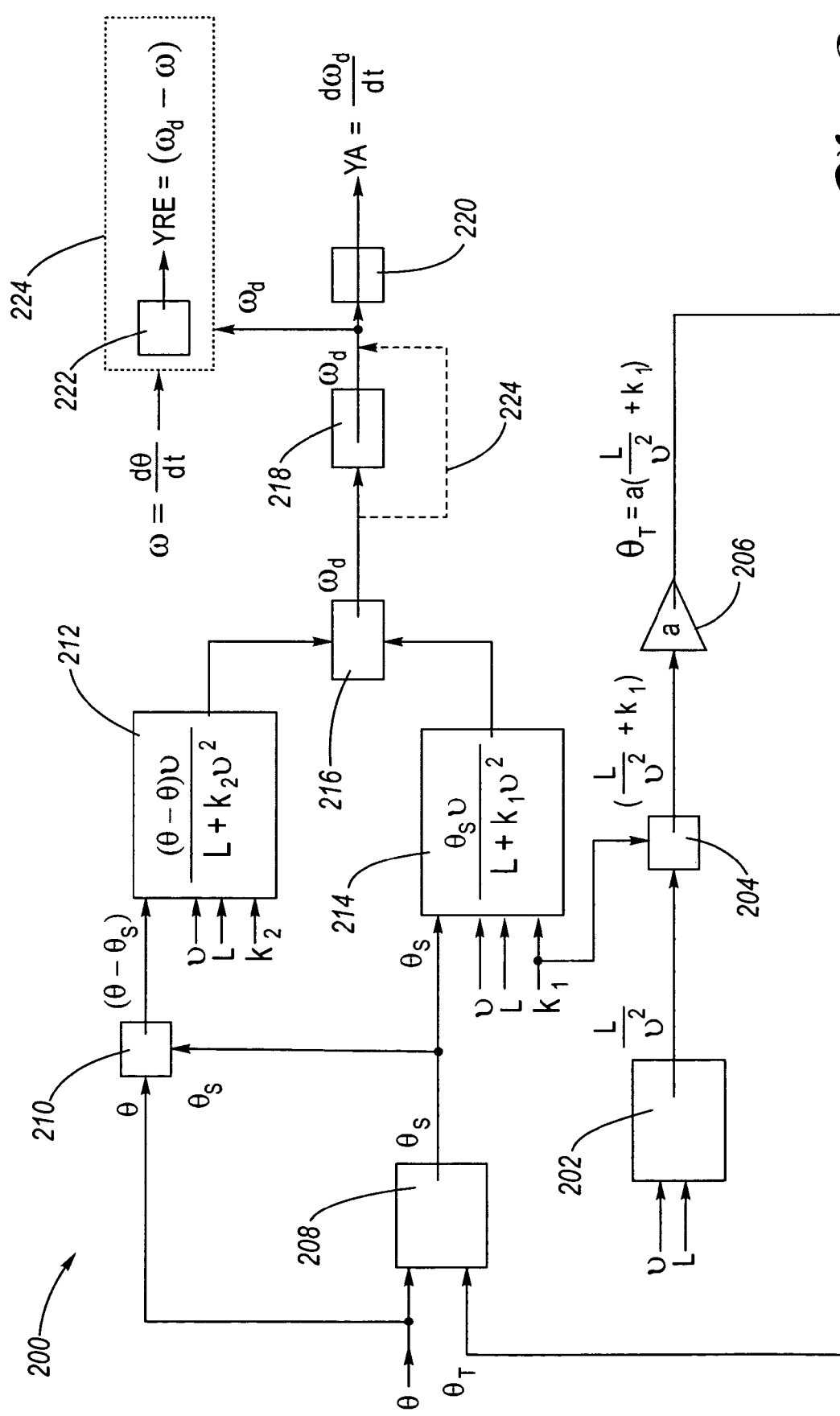

CLOSED LOOP VEHICLE DYNAMIC CONTROL FOR USE WITH YAW RATE CONTROLLERS

TECHNICAL FIELD

The present invention relates to motor vehicle dynamic control and, more particularly, to vehicles utilizing a variable understeer gradient for closed loop dynamic control.

BACKGROUND OF THE INVENTION

A torque-vectoring differential (TVD), which is well known in the prior art, is an electronically controlled differential that can create an understeering or oversteering moment about the center of gravity of a motor vehicle independent of the speeds of the wheels so as to affect the dynamics of a vehicle, utilizing concepts of understeer and oversteer gradients that are well understood in the prior art. A TVD is different from a Limited Slip Differential (LSD) which generates understeer or oversteer moments as a function of the wheel speed difference across the LSD. Therefore, the ability of a TVD to create an understeering or oversteering moment about the center of gravity of a motor vehicle independent of the speeds of the wheels, up to a fixed limit of wheel speed difference, greatly increases the range of authority that a TVD has on vehicle dynamics, as compared with an LSD.

FIG. 1 is a schematic depiction of a motor vehicle 100 illustrating the operation of, for example, a torque vectoring differential 102 about the center of gravity 104 of the motor vehicle. The motor vehicle 100 has a track width (ie., wheelbase width) L. The left rear (LR) wheel torque 108 and the right rear (RR) wheel torque 110 generate a TVD yaw moment 112 about the center of gravity 104, via, for example a TVD 102, wherein arrow 114 designates the path of the motor vehicle 100.

In this regard, a delta torque, (LR Wheel Torque 108-RR Wheel Torque 110) output, generated by a variety of yaw rate controllers, which is well know in the prior art, is input to, for example, a TVD 102 to produce the yaw moment 112 generated about the center of gravity 104 of the motor vehicle 100, and can be expressed as:

$$\text{Yaw Moment} = (LR \text{ Wheel Torque} - RR \text{ Wheel Torque}) \cdot (L/(2(\text{Tire Radius}))), \quad (1)$$

wherein the track width (wheelbase width) L and Tire Radius of the motor vehicle are known. The input to the various yaw rate controllers, as is well known in the prior art, are a desired vehicle yaw rate and measured vehicle yaw rate or a vehicle yaw rate error and a desired vehicle yaw acceleration (yaw rate commands) from which the yaw rate controller outputs the delta torque (i.e., LR Wheel Torque 108—RR Wheel Torque 110) to the TVD 102.

The methodology utilized by the prior art is an entirely empirical method, utilizing an empirical dual look-up table based methodology for generating desired yaw rate commands for use with a TVD. The method of the prior art requires extensive vehicle testing with physical hardware, requiring extended development time, is limited to producing yaw rates observed in the test regime, and requires a measurement of vehicle lateral acceleration. Furthermore, the prior art method generates a nonlinear vehicle response if a continuous variation of the understeer gradient is attempted. The method of the prior art is, therefore, unsatisfactory, since it does not consider true driver objectives and is dependent on actuator limitations.

Accordingly, what is needed in the art is a method for generating yaw rate commands for providing closed loop vehicle dynamic control with torque vectoring differentials.

SUMMARY OF THE INVENTION

The present invention is a method for continuously generating vehicle yaw rate errors and desired vehicle yaw accelerations (yaw rate commands) for closed loop vehicle dynamic control for use with, for example, a torque vectoring differential (TVD), via a yaw rate controller as previously described, based on vehicle dynamic objectives regardless of operating conditions and provides a linear vehicle response that is not actuator specific, does not need a reference table, extensive vehicle measurements, or time consuming tuning.

The present invention utilizes a measured vehicle road wheel angle, a measured vehicle velocity, a measured vehicle yaw rate, a known track width (ie., wheelbase width), an empirically determined vehicle lateral acceleration threshold, and first and second empirically determined understeer gradients to continually and dynamically generate, to be described later, desired vehicle yaw rates or vehicle yaw rate errors and desired vehicle yaw accelerations for closed loop vehicle dynamic control for use, for example, with a torque vectoring differential, via a yaw rate controller as previously described. The vehicle road wheel angle, vehicle velocity, vehicle yaw rate, and wheelbase width are available from vehicle sensors or vehicle microprocessor memory. The first and second understeer gradients and vehicle lateral acceleration threshold are based on simulation data or empirical data and are chosen such that the vehicle handles in a predetermined manner based on simulation or empirical results.

For low to moderate vehicle lateral accelerations, a constant understeer gradient results in a linear relationship between steer angle and vehicle lateral acceleration at constant vehicle speed. This means that at high vehicle lateral accelerations, when the tires are approaching the nonlinear force regime, small increases in steer angle can drive the vehicle wheels into slip. In addition, since the understeer gradient of the base vehicle increases with vehicle lateral acceleration, very high actuation authority is required at high vehicle lateral accelerations to maintain the constant understeer gradient.

To overcome these drawbacks, the present invention is a method utilizing a first understeer gradient for linear (low to moderate) vehicle lateral accelerations at or below a vehicle lateral acceleration threshold and a second understeer gradient for saturated (high) vehicle lateral accelerations above the vehicle lateral acceleration threshold, wherein the vehicle lateral acceleration threshold defines a vehicle lateral acceleration transition point, wherein the vehicle lateral acceleration threshold at the vehicle lateral acceleration transition point is chosen such that the vehicle handles in a predetermined manner based on simulation or empirical results, and wherein discontinuities in desired vehicle yaw rates and desired vehicle yaw accelerations utilizing the first and second understeer gradients at the vehicle lateral acceleration transition point are avoided.

Many variations in the embodiments of present invention are contemplated as described herein in more detail. Other applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawings wherein like reference numerals refer to like parts throughout the several views.

FIG. 2 is a functional schematic representation according to the present invention.

DESCRIPTION OF THE PREFERRED EMBODIMENT

Figure 1:
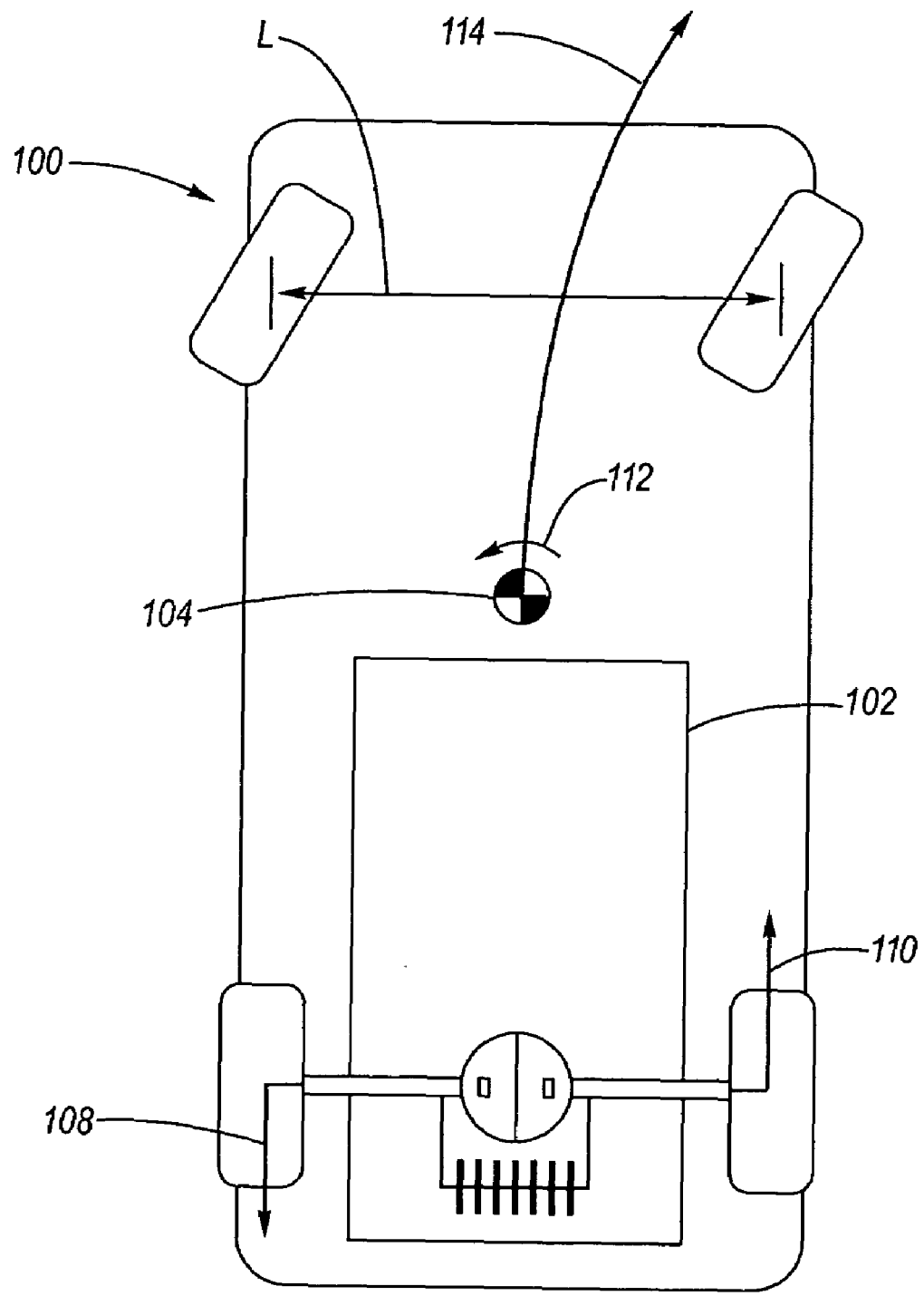
FIG. 1 is a schematic depiction of a motor vehicle which illustrates the operation of a torque vectoring differential.

The difference between a desired vehicle yaw rate and the calculated or measured vehicle yaw rate produce a vehicle yaw rate error. Differentiating the desired vehicle yaw rate with respect to time produces the desired vehicle yaw acceleration. The desired vehicle yaw rate and the measured vehicle yaw rate or the vehicle yaw rate error and desired vehicle yaw acceleration are input to a yaw rate controller for use with, for example, a TVD as previously described.

At or below the aforementioned vehicle lateral acceleration transition point, the desired vehicle yaw rate may be expressed as:

$$\omega_{d1} = (\theta \cdot v)/(L + k_1 \cdot v^2) \text{ Rad/s,} \tag{2}$$

where (using meter-kilogram-second units), $\theta$ is the measured road wheel angle in radians, $v$ is the measured vehicle speed in m/s, L is the known track or wheelbase width in m, and $k_1$ is a first understeer gradient in rad·s$^2$/m. The desired vehicle yaw rate generated by Equation (2) is independent of actuator capability and more accurately represents vehicle performance objectives than the prior art.

Above the aforementioned vehicle lateral acceleration transition point, the desired vehicle yaw rate could be expressed as:

$$\omega_{d2}' = (\theta \cdot v)/(L + k_2 \cdot v^2) \text{ Rad/s,} \tag{3}$$

where, $\theta$ is the measured road wheel angle in radians, $v$ is the measured vehicle speed in m/s, L is the known wheelbase width in m, and $k_2$ is a second understeer gradient in rad·s$^2$/m. However, due to the different values of the first and second understeer gradients $k_1$ and $k_2$, discontinuities in the desired vehicle yaw rate and desired vehicle yaw acceleration at the vehicle lateral acceleration transition point would occur with an abrupt transition from $k_1$ at or below the vehicle lateral acceleration transition point to $k_2$ above the vehicle lateral acceleration transition point.

To avoid discontinuities in the desired vehicle yaw rate and desired vehicle yaw acceleration at the vehicle lateral acceleration transition point, and to provide a piecewise linear vehicle response below, at, or above the vehicle lateral acceleration transition point, the desired vehicle yaw rate above the aforementioned vehicle lateral acceleration transition point is expressed as:

$$\omega_{d2} = (\theta \cdot v)/(L + k_2 \cdot v^2) + C \text{ Rad/s,} \tag{4}$$

wherein the variables, except for the parameter C, are as defined in Equation (3). The parameter C in Equation (4) is utilized to avoid discontinuities in the desired vehicle yaw rate and desired vehicle yaw acceleration at the vehicle lateral acceleration transition point due to the different values of the first and second understeer gradients $k_1$ and $k_2$, and to provide a piecewise linear vehicle response below, at, or above the vehicle lateral acceleration transition point, The parameter C is selected such that at the vehicle lateral acceleration transition point, the desired vehicle yaw rate at or below the vehicle lateral acceleration transition point, Equation (2), is equal to the desired vehicle yaw rate above the vehicle lateral acceleration transition point, Equation (4), wherein $\theta = \theta_T$ in Equations (2) and (4) is the threshold road wheel angle at the vehicle lateral acceleration transition point in radians. That is:

$$(\theta_T \cdot v)/(L + k_1 \cdot v^2) = (\theta_T \cdot v)/(L + k_2 \cdot v^2) + C \text{ Rad/s.} \tag{5}$$

Solving Equation (5) for C yields:

$$C = (\theta_T \cdot v)/(L + k_1 \cdot v^2) - (\theta_T \cdot v)/(L + k_2 \cdot v^2) \text{ Rad/s.} \tag{6}$$

The desired vehicle yaw rate above the aforementioned vehicle lateral acceleration transition point, Equation (4), can now be written as:

$$\omega_{d2} = (\theta \cdot v)/(L + k_2 \cdot v^2) + (\theta_T \cdot v)/(L + k_1 \cdot v^2) - (\theta_T \cdot v)/(L + k_2 \cdot v^2) \text{ Rad/s.} \tag{7}$$

The threshold road wheel angle, $\theta_T$, at the vehicle lateral acceleration transition point is defined by:

$$\theta_T = a(L/v^2 + k_1) \text{ Rad} \tag{8}$$

where the parameter a is the chosen vehicle lateral acceleration threshold in m/s$^2$.

The desired vehicle yaw rate at or below the vehicle lateral acceleration transition point, Equation (2), and the desired vehicle yaw rate above the vehicle lateral acceleration transition point, Equation (7), wherein discontinuities in the desired vehicle yaw rate and desired vehicle yaw acceleration at the vehicle lateral acceleration transition point due to the different values of the first and second understeer gradients $k_1$ and $k_2$ are avoided, may both be incorporated within:

$$\omega_d = (\theta_S \cdot v)/(L + k_1 \cdot v^2) + ((\theta - \theta_S) \cdot v)/(L + k_2 \cdot v^2) \text{ Rad/s} \tag{9}$$

where $\theta_S$ is a saturation function of the measured road wheel angle $\theta$ with vehicle lateral acceleration threshold limits.

At or below the vehicle lateral acceleration transition point where the measured road wheel angle $\theta \leq \theta_T$, $\theta_S = \theta$, the measured road wheel angle, Equation (9) reduces to Equation (2) resulting in desired vehicle yaw rates at or below the vehicle lateral acceleration transition point wherein $\theta_T$ is determined by Equation (8). Differentiating the resulting desired vehicle yaw rate with respect to time produces the desired vehicle yaw acceleration at or below the vehicle lateral acceleration transition point.

Above the vehicle lateral acceleration transition point where the measured road wheel angle $\theta > \theta_T$, $\theta_S = \theta_T$, the road wheel angle at the vehicle lateral acceleration transition point, Equation (9) reduces to Equation (7) resulting in desired vehicle yaw rates above the vehicle lateral acceleration transition point wherein $\theta_T$ is determined by Equation (8). Differentiating the resulting desired vehicle yaw rate with respect to time produces the desired vehicle yaw acceleration above the vehicle lateral acceleration transition point.

FIG. 2 is a functional schematic representation 200 according to the present invention for implementing, by way of example, Equation (9), wherein the implementations of Blocks 202 through 222 are well known in the prior art. The parameters and variables in FIG. 2 are as defined by Equations (2) through (9).

The inputs to Block 202 are the vehicle speed v and the track or wheelbase width L. The output of Block 202 is the quantity $L/v^2$ which is input to Block 204, as well as a first understeer gradient $k_1$. The output of Block 204 is the quantity $(L/v^2+k_1)$ which is input to Gain Block 206 whose gain, a, is the vehicle lateral acceleration threshold. The output of Gain Block 206 is the threshold road wheel angle, $\theta_T$, defined by Equation (8) and is input to Block 208, as well as the measured road wheel angle, $\theta$. Block 208 has an output $\theta_S$, where $\theta_S=\theta$ if $\theta\leq\theta_T$ or $\theta_S=\theta_T$ if $\theta>\theta_T$ and may be implemented, for example, as a comparator. The measured road wheel angle $\theta$ and $\theta_S$ are input to Block 210 whose output is the difference $(\theta-\theta_S)$ which is then input to Block 212.

The vehicle speed, v, track or wheelbase width, L, and a second understeer gradient, $k_2$, are also input to Block 212. The output of Block 212 is the function $((\theta-\theta_S)\cdot v)/(L+k_2\cdot v^2)$ which is the second term on the right hand side of Equation (9). The output of Block 208, $\theta_S$, the vehicle speed, v, track or wheelbase width, L, and a first understeer gradient, $k_1$, are input to Block 214.

The output of Block 214 is the function $(\theta_S\cdot v)/(L+k_2\cdot v^2)$ which is the first term on the right hand side of Equation (9). The outputs of Block 212 and Block 214 are input to Block 216. Block 216 is a summing block whose output is the sum of Block 212 and Block 214. The output of Block 216 is, thus, Equation (9). If $\theta_S=\theta$ then $\theta\leq\theta_T$, the desired vehicle yaw rate is at or below the vehicle lateral acceleration transition point. Then, the output of Block 212 is zero and the output of Block 216 is Equation (2). However, if $\theta_S=\theta_T$ then $\theta>\theta_T$, the desired vehicle yaw rate is above the vehicle lateral transition threshold. Then, the output of Block 216 is Equation (7).

The output of Block 216 is input, if desired, to Block 218 whose output is a noise filtered desired vehicle yaw rate, $\omega_d$. Otherwise, the output of Block 216 follows path 224. The desired vehicle yaw rate output from Block 216 or Block 218 is input to Block 220 and Block 222. Block 220 is a differentiator whose output is the time derivative of the desired vehicle yaw rate yielding the desired vehicle yaw acceleration, $d\omega_d/dt$.

A yaw rate error is obtained in Block 224, which may be implemented in the yaw rate controller. The measured vehicle yaw rate is also input to Block 222 along with the desired vehicle yaw rate. The output of Block 222 is the difference between the desired vehicle yaw rate and the measured or calculated vehicle yaw rate, which is the yaw rate error.

The desired vehicle yaw rate and measured vehicle yaw rate, or the yaw rate error and desired vehicle yaw acceleration are input to a yaw rate controller for use with, for example, a TVD as previously described.

An example of the implementation of FIG. 2 utilizing a first understeer gradient for linear (low to moderate) vehicle lateral accelerations at or below a vehicle lateral acceleration threshold would have a value of $k_1=0.0023$ rad·s$^2$/m and a second understeer gradient for saturated (high) vehicle lateral accelerations above the vehicle lateral acceleration threshold would have a value of $k_2=0.007$ rad·s$^2$/m, wherein the vehicle lateral acceleration threshold defining a vehicle lateral acceleration transition point, wherein the vehicle lateral acceleration threshold at the vehicle lateral acceleration transition point would have a value $a=5.8951$ m/s$^2$ such that the vehicle handles in a predetermined manner based on simulation or empirical results, and wherein discontinuities in desired vehicle yaw rates and desired vehicle yaw accelerations utilizing the first and second understeer gradients at the vehicle lateral acceleration transition point are avoided.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for generating desired vehicle yaw rates and desired vehicle yaw accelerations for closed loop dynamic control, comprising the steps of:
    determining a vehicle lateral acceleration transition point;
    determining a first understeer gradient for vehicle lateral accelerations at and below the predetermined vehicle lateral acceleration transition point;
    determining a second understeer gradient for vehicle lateral accelerations above the predetermined vehicle lateral acceleration transition point;
    measuring an actual vehicle yaw rate;
    determining a first desired vehicle yaw rate pursuant to said step of determining the first understeer gradient for vehicle lateral accelerations at and below the predetermined vehicle lateral acceleration transition point;
    determining a second desired vehicle yaw rate pursuant to said step of determining the second understeer gradient for vehicle lateral accelerations above the predetermined vehicle lateral acceleration transition point, wherein the second desired vehicle yaw rate at the predetermined vehicle lateral acceleration transition point is calibrated to equal the first desired vehicle yaw rate at the predetermined vehicle lateral acceleration transition point so as to avoid any discontinuity therebetween at the predetermined vehicle lateral acceleration transition point;
    differentiating with respect to time the first desired vehicle yaw rate to thereby provide a desired vehicle yaw acceleration for vehicle lateral accelerations at and below the predetermined vehicle lateral acceleration transition point; and
    differentiating with respect to time the second desired vehicle yaw rate to thereby provide a desired vehicle yaw acceleration for vehicle lateral accelerations above the predetermined vehicle lateral acceleration transition point.

2. The method of claim 1, wherein said step of determining said first desired vehicle yaw rate is expressed as:
$\omega_{d1}=(\theta\cdot v)/(L+k_1\cdot v^2)$ Rad/s, where, $\omega_{d1}$ is the first desired yaw rate, $\theta$ is a measured road wheel angle in radians, v is a measured vehicle speed in m/s, L is a predetermined wheelbase width in m, and $k_1$ is the first understeer gradient in rad·s$^2$/m.

3. The method of claim 2, wherein said step of determining said second desired vehicle yaw rate is expressed as:

$$\omega_{d2}=(\theta\cdot v)(L+k_2\cdot v^2)+(\theta_T\cdot v)/(L+k_1\cdot v^2)-(\theta_T\cdot v)/(L+k_2\cdot v^2)\text{ Rad/s,}$$

where $\omega_{d2}$ is the second desired yaw rate, $\theta_T$ is defined by: $\theta_T=a(L/v^2+k_1)$ Rad, a is a vehicle lateral acceleration threshold in m/s$^2$ at the predetermined vehicle lateral acceleration transition point, $\theta$ is the measured road wheel angle in radians, v is the measured vehicle speed in m/s, L is the predetermined wheelbase width in m, $k_1$ is the first understeer gradient in rad·s$^2$/m, and $k_2$ is the second understeer gradient in rad·s$^2$/m.

4. The method of claim 1, wherein said steps of determining said first and second desired vehicle yaw rate are expressed as:

$$\omega_d = (\theta_S \cdot v)/(L + k_1 v^2) + ((\theta - \theta_S) \cdot v)/(L + k_2 \cdot v^2) \text{Rad/s},$$

where $\omega_d$ is the first and second desired yaw rates, $\theta_S$ is a saturation function of a measured road wheel angle $\theta$ with predetermined vehicle lateral acceleration threshold limits, $\theta$ is a measured road wheel angle in radians, v is a measured vehicle speed in m/s, L is a predetermined wheelbase width in m, $k_1$ is the first understeer gradient in rad·s²/m, and $k_2$ is the second understeer gradient in rad·s²/m;

wherein at and below the predetermined vehicle lateral acceleration transition point, whereat the measured road wheel angle $\theta \leq \theta_T$, then $\theta_S = \theta$, wherein $\theta_T$ is defined by: $\theta_T = a(L/v^2 + k_1)$ Rad, where a is a vehicle lateral acceleration threshold in m/s² at the predetermined vehicle lateral acceleration transition point; and wherein above the predetermined vehicle lateral acceleration transition point, whereat the measured road wheel angle 74 > $\theta_T$, then $\theta_S = \theta_T$.

5. The method of claim 4, wherein implementation of the expression for $\omega_d$ comprises the steps of:

obtaining values for v and L to obtain a first quantity, $L/v^2$;

obtaining a value for $k_1$;

combining the first quantity with $k_1$ to obtain a second quantity $(L/v^2 + k_1)$;

obtaining a value for a;

gaining the second quantity by a to obtain $\theta_T$;

comparing $\theta$ with $\theta_T$ to obtain $\theta_S$;

obtaining a third quantity, $(\theta - \theta_S)$;

obtaining a value for $k_2$;

combining the third quantity with v, L, and $k_2$ to obtain a fourth quantity, $((\theta - \theta_S) \cdot v)/(L + k_2 \cdot v^2)$;

combining v, L, $k_1$ and $\theta_S$ to obtain a fifth quantity, $(\theta_S \cdot v)/(L + k_1 \cdot v^2)$; and adding said fourth and fifth quantities to thereby obtain $\omega_d$.

6. The method of claim 5, further comprising the step of filtering noise after said step of combining said fourth and fifth quantities.

7. The method of claim 5, wherein said steps of differentiating comprise differentiating $\omega_d$ with respect to time to thereby provide the desired vehicle yaw acceleration.

8. The method of claim 7, further comprising the step of filtering noise after said step of combining said fourth and fifth quantities and before said step of differentiating.

9. A method for generating desired vehicle yaw rates, yaw rate errors and desired vehicle yaw accelerations for closed loop dynamic control, comprising the steps of:

determining a vehicle lateral acceleration transition point;

determining a first understeer gradient for vehicle lateral accelerations at and below the predetermined vehicle lateral acceleration transition point;

determining a second understeer gradient for vehicle lateral accelerations above the predetermined vehicle lateral acceleration transition point;

measuring an actual vehicle yaw rate;

determining, a first desired vehicle yaw rate pursuant to said step of determining the first understeer gradient for vehicle lateral accelerations at and below the predetermined vehicle lateral acceleration transition point;

determining a second desired vehicle yaw rate pursuant to said step of determining the second understeer gradient for vehicle lateral accelerations above the predetermined vehicle lateral acceleration transition point, wherein the second desired vehicle yaw rate at the predetermined vehicle lateral acceleration transition point is calibrated to equal the first desired vehicle yaw rate at the predetermined vehicle lateral acceleration transition point so as to avoid any discontinuity therebetween at the predetermined vehicle lateral acceleration transition point;

differentiating with respect to time the first desired vehicle yaw rate to thereby provide a desired vehicle yaw acceleration for vehicle lateral accelerations at and below the predetermined vehicle lateral acceleration transition point;

differentiating with respect to time the second desired vehicle yaw rate to thereby provide a desired vehicle yaw acceleration for vehicle lateral accelerations above the predetermined vehicle lateral acceleration transition point;

determining a difference between the first desired yaw rate and the measured yaw rate to thereby provide a vehicle yaw rate error for vehicle lateral accelerations at and below the predetermined vehicle lateral acceleration transition point; and determining a difference between the second desired yaw rate and the measured yaw rate to thereby provide a vehicle yaw rate error for vehicle lateral accelerations above the predetermined vehicle lateral acceleration transition point.

10. The method of claim 9, wherein said step of determining said first desired vehicle yaw rate is expressed as: $\omega_{d1} = (\theta \cdot v)/(L + k_1 \cdot v^2)$ Rad/s, where, $\omega_{d1}$ is the first desired yaw rate, $\theta$ is a measured road wheel angle in radians, v is a measured vehicle speed in m/s, L is a predetermined wheelbase width in m, and $k_1$ is the first understeer gradient in rad·s²/m.

11. The method of claim 10, wherein said step of determining said second desired vehicle yaw rate is expressed as:

$$\omega_{d2} = (\theta \cdot v)/(L + k_2 \cdot v^2) + (\theta_T \cdot v)/(L + k_1 \cdot v^2) - (\theta_T \cdot v)/(L + k_2 \cdot v^2) \text{ Rad/s},$$

where $\omega_{d2}$ is the second desired yaw rate, $\theta_T$ is defined by: $\theta_T = a(L/v^2 + k_1)$ Rad, a is a vehicle lateral acceleration threshold in m/s² at the predetermined vehicle lateral acceleration transition point, $\theta$ is the measured road wheel angle in radians, v is the measured vehicle speed in m/s, L is the predetermined wheelbase width in m, $k_1$ is the first understeer gradient in rad·s²/m, and $k_2$ is the second understeer gradient in rad·s²/m.

12. The method of claim 9, wherein said steps of determining said first and second desired vehicle yaw rate are expressed as:

$$\omega_d = (\theta_S \cdot v)/(L + k_1 \cdot v^2) + ((\theta - \theta_S) \cdot v)/(L + k_2 \cdot v^2) \text{Rad/s},$$

where $\omega_d$ is the first and second desired yaw rates, $\theta_S$ is a saturation function of a measured road wheel angle $\theta$ with predetermined vehicle lateral acceleration threshold limits, $\theta$ is a measured road wheel angle in radians, v is a measured vehicle speed in m/s, L is a predetermined wheelbase width in m, $k_1$ is the first understeer gradient in rad·s²/m, and $k_2$ is the second understeer gradient in rad·s²/m;

wherein at and below the predetermined vehicle lateral acceleration transition point, whereat the measured road wheel angle $\theta \leq \theta_T$, then $\theta_S = \theta$, wherein $\theta_T$ is defined by: $\theta_T = a(L/v^2 + k_1)$ Rad, where a is a vehicle lateral acceleration threshold in m/s² at the predetermined vehicle lateral acceleration transition point; and wherein above the predetermined vehicle lateral acceleration transition point, whereat the measured road wheel angle $\theta > \theta_T$, then $\theta_S = \theta_T$.

13. The method of claim 12, wherein implementation of the expression for $\omega_d$ comprises the steps of:
    obtaining values for v and L to obtain a first quantity, $L/v^2$;
    obtaining a value for $k_1$;
    combining the first quantity with $k_1$ to obtain a second quantity ($L/v^2 + k_1$);
    obtaining a value for a;
    gaining the second quantity by a to obtain $\theta_T$;
    comparing $\theta$ with $\theta_T$ to obtain $\theta_S$;
    obtaining a third quantity, $(\theta - \theta_S)$;
    obtaining a value for $k_2$;
    combining the third quantity with v, L, and $k_2$ to obtain a fourth quantity, $((\theta - \theta_S) \cdot v)/(L + k_2 \cdot v^2)$;
    combining v, L, $k_1$ and $\theta_S$ to obtain a fifth quantity, $(\theta_S \cdot v)/(L + k_1 \cdot v^2)$, and
    adding said fourth and fifth quantities to thereby obtain $\omega_d$.

14. The method of claim 13, further comprising the step of filtering noise after said step of combining said fourth and fifth quantities.

15. The method of claim 13, wherein said steps of differentiating comprise differentiating $\omega_d$ with respect to time to thereby provide the desired vehicle yaw acceleration.

16. The method of claim 15, further comprising the step of filtering noise after said step of combining said fourth and fifth quantities and before said step of differentiating.

17. The method of claim 13, wherein said steps of obtaining a difference comprise obtaining a difference between $\omega_d$ and the measured yaw rate to thereby provide the vehicle yaw rate error.

18. The method of claim 17, further comprising the step of filtering noise after said step of combining said fourth and fifth quantities and before said step obtaining a difference.

* * * * *